Figure 1:
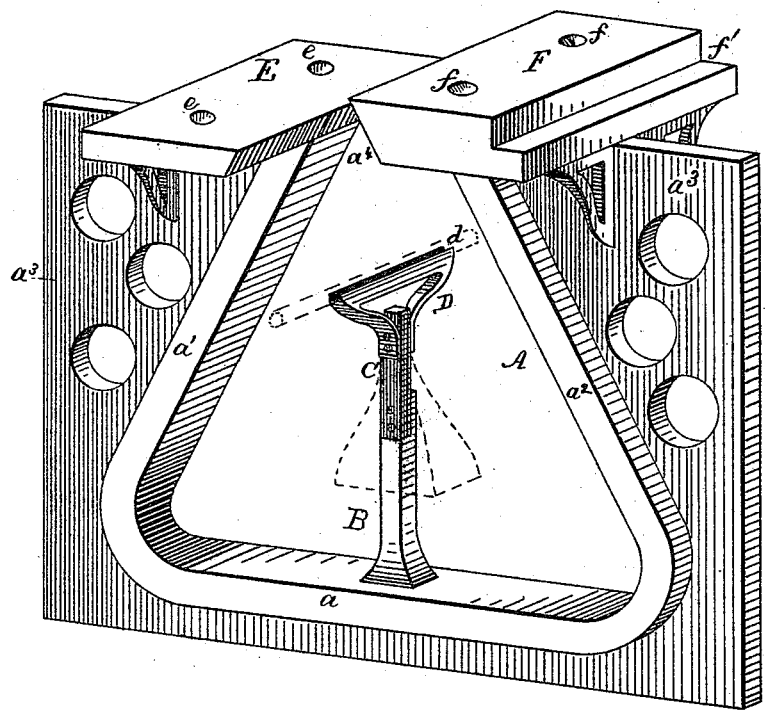

(No Model.) 2 Sheets—Sheet 1.

M. WHELESS.
CONDUIT FOR ELECTRIC RAILWAYS.

No. 441,212. Patented Nov. 25, 1890.

Witnesses
Thos. Houghton.
M. E. Cowell.

Inventor
Malone Wheless
per M. H. Singleton,
Attorney (No Model.) 2 Sheets—Sheet 2.
M. WHELESS.
CONDUIT FOR ELECTRIC RAILWAYS.
No. 441,212. Patented Nov. 25, 1890.
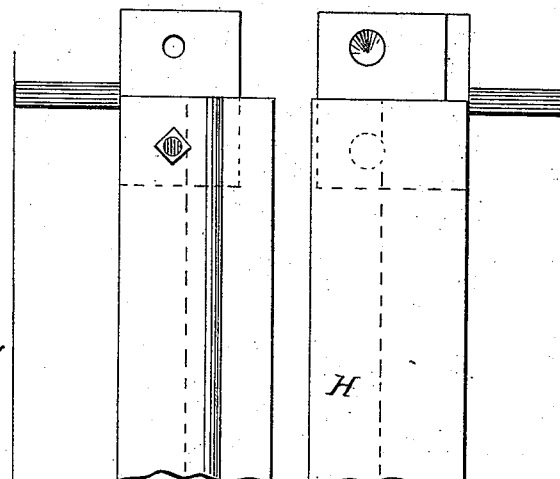
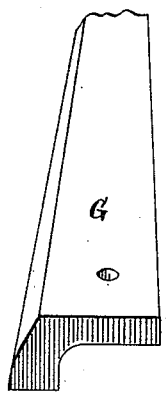
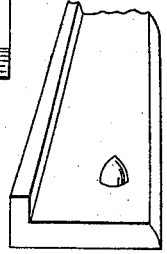
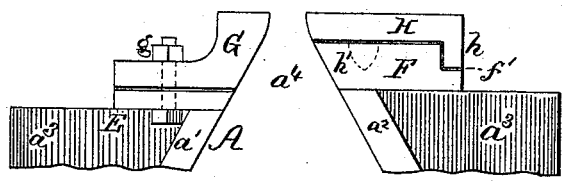
Witnesses
Thoˢ Houghton.
M. E. Cowell.
Inventor
Malone Wheless,
per W. H. Singleton,
Attorney

UNITED STATES PATENT OFFICE.

MALONE WHELESS, OF NASHVILLE, TENNESSEE, ASSIGNOR TO THE WHELESS ELECTRIC RAILWAY COMPANY, OF ALEXANDRIA, VIRGINIA.

CONDUIT FOR ELECTRIC RAILWAYS.

SPECIFICATION forming part of Letters Patent No. 441,212, dated November 25, 1890.

Application filed May 12, 1890. Serial No. 351,390. (No model.)

*To all whom it may concern:*

Be it known that I, MALONE WHELESS, a citizen of the United States, residing at Nashville, in the county of Davidson and State of Tennessee, have invented certain new and useful Improvements in Conduits for Electric-Railway Systems; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a perspective view of one of the brackets. Fig. 2 is a top view of a section of the conduit. Fig. 3 is a part end view thereof. Figs. 4 and 5 are under side views of the covering-plates.

This invention relates to improvements in conduits for the cable or wire used in underground electric-railway systems; and it consists in the construction hereinafter set forth.

In the annexed drawings, the letter A indicates a bracket having substantially a triangular shape, as shown. It consists of the bottom $a$ and sides $a'$ $a^2$, and preferably has the web $a^3$. Rising from the middle of the bottom is the standard B, to the top of which is secured an insulator C, made of okenite or other insulating material. Secured to the top of this insulator C is the cable-rest D, having the groove $d$ on its top. Made with the bracket A are the top-plate supports E and F, located on each side of the opening $a^4$ of the bracket and extending out each side of the bracket. The plate E has the two holes $e$ $e$. The plate F has the two recesses $f$ $f$ and the rabbet $f'$ on the outer edge. In use these brackets are placed at convenient distances apart—say seven or eight feet. Between them the walls of the conduit are made of wood, terra-cotta, or brick-work, the walls coming against the webs $a^3$ and holding the brackets firmly in place. At the tops these walls are spaced apart. On one side a cover-plate G is permanently secured in place by bolts $g$, passing through holes in said plate and the holes $e$ of the plate E. Between the edge $g'$ of this plate G and the top of the wall of the conduit on the other side there should be space enough to permit free admission into the conduit for inspection, &c. In the grooves $d$ is to be placed the cable or wire. Along the top of the wall of the conduit opposite to the plate G is placed the removable plate H. This plate has the flange $h$, which fits the rabbet $f$, and may have a teat $h'$, fitting a recess $f'$ in the plate F. This flange $h$ may be extended the whole length of the plate H, and the top wall of the conduit may be adapted to receive it. Between the inner edges of the cover-plates G and H is the usual slot I, coming directly over the cable. If desired, a hood (shown in dotted lines at K) may be placed on the cable-supporting standard, so as to prevent drip-water from striking against the insulator. The plate H is readily removable by simply lifting it out of place, its weight keeping it down.

Having thus described my invention, what I claim is—

1. The bracket A, having the plates E and F extending out each side of the bracket, and the cable-standard B, as set forth.

2. The bracket A, having the cable-standard B, the insulator C, and the support D, made with the groove $d$, as set forth.

3. The combination of the brackets A, having the plates E and F, with the plates G and H, the former permanently secured, the other removably, to the brackets, as set forth.

4. A conduit for underground electric-railway systems, consisting of brackets made with cable-standards and spaced apart, the walls of the conduit running from bracket to bracket and spaced apart at the top, cover-plates spaced apart and covering the space between the tops of the conduit-walls, one of said cover-plates being permanently and the other removably secured to the brackets, as set forth.

In testimony whereof I affix my signature in presence of two witnesses.

MALONE WHELESS.

Witnesses:
F. F. BATES,
GRAHAM L. GORDON.